Nov. 27, 1923.  
E. D. DODGE  
1,475,758  
BUMPER FOR AUTOMOBILES  
Filed June 4, 1923
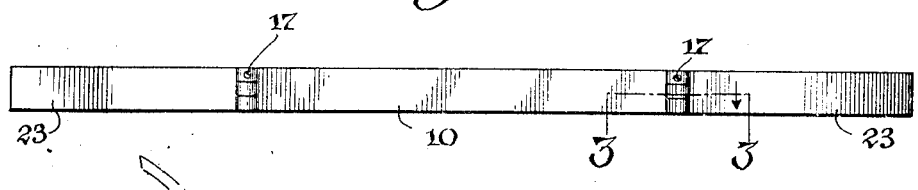
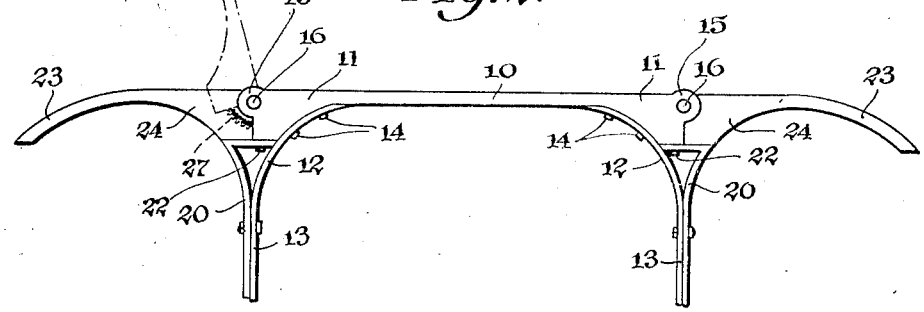
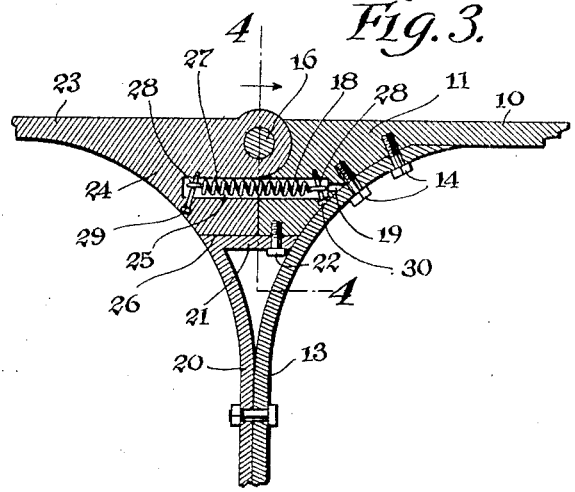
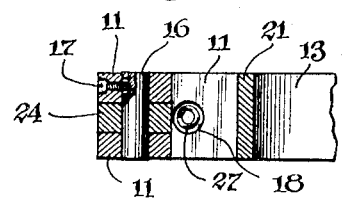
Inventor  
EARLE D. DODGE
By  
Attorney Patented Nov. 27, 1923.

1,475,758

UNITED STATES PATENT OFFICE.

EARLE D. DODGE, OF WESTERN PORT, MARYLAND.

BUMPER FOR AUTOMOBILES.

Application filed June 4, 1923. Serial No. 643,269.

*To all whom it may concern:*

Be it known that I, EARLE D. DODGE, a citizen of the United States, residing at Western Port, in the county of Allegany and State of Maryland, have invented certain new and useful Improvements in Bumpers for Automobiles, of which the following is a specification.

This invention relates to bumpers for automobiles, and other like vehicles.

More particularly, the invention relates to a bumper having ends arranged for automatic release upon movement of the vehicle in a direction opposite to that in which it ordinarily moves when the particular bumper is effective so that the bumper cannot be broken by stresses on the ends exerted in the wrong direction, as by catching against a lamp post or tree when backing away from a curb if the bumper is on the front, or in leaving the curb in a forward direction if the bumper is on the back.

One important object of the invention is to improve the general construction of bumpers of this character.

A second important object of the invention is to provide an improved arrangement of brace for such bumpers.

A third important object of the invention is to provide an improved arrangement for mounting the springs used in this device to hold the ends of the bumper in alinement with the central portion thereof.

With the above and other objects in view as will be hereinafter apparent, the invention consists in general of certain novel details of construction and combinations of parts hereinafter more fully described, illustrated in the accompanying drawings, and specifically claimed.

In the accompanying drawings like characters of reference indicate like parts in the several views, and:

Fig. 1 is a front view of a bumper constructed in accordance with this invention.

Fig. 2 is a plan view thereof.

Fig. 3 is an enlarged detail section on the line 3—3 of Fig. 1.

Fig. 4 is a section on the line 4—4 of Fig. 3.

In the construction of a bumper in accordance with this invention, there is provided a central member 10 having enlarged ends 11. These enlarged ends have arcuate faces on their rear sides so that the arcuate end 12 of a supporting bracket 13 may fit thereon and be secured by the bolts 14. The extremity of this enlarged end is provided with hinge joint portions 15 receiving a hinge pin 16, which is secured against falling out by a binding screw or set screw 17. Furthermore, each extremity of the central member is provided with a bore 18 extending inward from its outer face and terminating at its inner end in a reduced portion 19 which opens through the arcuate face of the end. Secured to each bracket member 13 is a second bracket member 20, also of arcuate form for a portion of its length, and terminating in a laterally disposed portion 21 extending toward the arcuate end 12 of the bracket 13, this laterally disposed portion extending behind the enlarged end 11, and being secured thereto by a bolt 22. Mounted on the pivot pin 16 at each end of the central member is a swinging end member 23 having an enlarged head or inner end 24 provided with a recess or bore 25 alined with the recess or bore 18 when the device is in ordinary operating position. The enlarged head 24 also has a flat rear surface 26 which bears against the lateral extension 21 of the second bracket.

Within the recess 18 and recess 25 is mounted a spring 27, this spring preferably being a coiled tension spring, and having an eye 28 at each end. Through the eye at the outer end of the spring passes a bolt or screw 29 which serves to hold this outer end in position in the recess 25. Similarly a bolt or screw 30 extends through the eye at the inner end of the spring, and this eye is located closely adjacent the reduced end 19 of the recess.

In assembling the device, it will be seen that it is a simple matter to swing one of the end members 23 forward and insert one end of the spring in the recess 25 in such manner that the screw 29 may be readily passed through the eye 28. Then, before the bracket 13 is applied, a wire or string may be run through the reduced end 19 and recess 18, and engaged with the inner end of the eye 28. The end member 23 can then be swung back and the spring tensioned by pulling on the wire or string after which the bolt or screw 30 may be inserted, thus holding the spring at all times under tension.

From the foregoing, it will be observed that the peculiar bracket arrangement provides for great strength against the ordinary shocks to which the bumper may be subjected, while at the same time the peculiar recess and spring arrangement provides for ease for assembling.

There has thus been provided a simple and efficient device of the kind described and for the purpose specified.

It is obvious that minor changes may be made in the form and construction of the invention without in any way departing from the material spirit thereof. It is not, therefore, desired to confine the invention to the exact form herein shown and described, but it is desired to include all such as properly come within the scope claimed.

Having thus described the invention, what is claimed as new, is:

1. In a device of the kind described, a central member having enlarged ends provided with arcuate rear surfaces, bracket members having arcuate forward ends engaging the arcuate rear surfaces of the central member, and secured thereto, end members each having an inner end corresponding to the respective outer end of the central member, hinged connection between the end member and the central member, other bracket members secured to the first mentioned bracket members and having lateral extensions against which the rear surfaces at the ends of the central and end members contact, means for securing the lateral extensions to the central member, and spring means for holding the end members normally in operative relation to the central member.

2. In a device of the kind described, a central member, end members hinged to said central members adjacent their forward faces, said central and end members having their adjacent end portions enlarged rearwardly and provided in said enlarged end portions with alined recesses, the recess at each end of the central member having a relatively large outer portion, and a relatively small inner portion, coiled tension springs each positioned in a respective pair of said recesses, a securing screw passing through the outer end of each of said springs and engaging in the end member, and a second securing screw passing through the inner end of each spring and engaging the respective end of the center member, said last mentioned securing screw being positioned closely adjacent the reduced portion of the respective recess.

In testimony whereof I affix my signature.

EARLE D. DODGE.